United States Patent [19]

Ikeshita

[11] Patent Number: 6,005,784
[45] Date of Patent: Dec. 21, 1999

[54] VOLTAGE TYPE INVERTER DEVICE AND METHOD OF CONTROLLING THE SAME

[75] Inventor: Wataru Ikeshita, Tokyo, Japan

[73] Assignee: Mitsubishi Denki Kabushiki Kaisha, Tokyo, Japan

[21] Appl. No.: 08/815,512

[22] Filed: Mar. 12, 1997

[30] Foreign Application Priority Data

Jun. 28, 1996 [JP] Japan ................................. 8-169947

[51] Int. Cl.⁶ .............................. H02M 5/45; H02P 5/28
[52] U.S. Cl. ............................... 363/37; 318/805; 318/811
[58] Field of Search ................................ 363/37, 41, 55, 363/56, 95, 97, 131, 132; 318/805, 811, 808, 810, 807

[56] References Cited

U.S. PATENT DOCUMENTS

| | | | |
|---|---|---|---|
| 4,788,485 | 11/1988 | Kawagishi et al. | 318/811 |
| 4,965,504 | 10/1990 | Ueda et al. | 363/37 |
| 5,250,890 | 10/1993 | Tanamachi et al. | 318/811 |
| 5,483,141 | 1/1996 | Uesugi | 318/811 |
| 5,483,167 | 1/1996 | Mikami | 363/37 |
| 5,532,569 | 7/1996 | Tanamachi et al. | 318/802 |
| 5,650,700 | 7/1997 | Mutoh et al. | 318/811 |
| 5,656,911 | 8/1997 | Nakayama et al. | 318/811 |
| 5,663,627 | 9/1997 | Ogawa | 318/811 |

FOREIGN PATENT DOCUMENTS

| | | | |
|---|---|---|---|
| 59-153467 | 1/1984 | Japan | H02M 7/48 |
| 60-26496 | 2/1985 | Japan | H02P 7/63 |
| 63-144795 | 6/1988 | Japan | H02P 7/63 |
| 1-99478 | 4/1989 | Japan | H02M 7/48 |

*Primary Examiner*—Peter S. Wong
*Assistant Examiner*—Bao Q. Vu
*Attorney, Agent, or Firm*—Sughrue, Mion, Zinn, Macpeak & Seas, PLLC

[57] ABSTRACT

A voltage-type inverter device includes a 1/2 V(DC) detecting circuit (31) for detecting a voltage between one end of a DC power supply (3) and an output from an inverter circuit (4); a voltage command value setting means (29) for commanding an output voltage from the inverter circuit; a first arithmetic means (32) for receiving the voltage command from the voltage command value setting means (29) and a detection voltage from the 1/2 V (DC) detection circuit (31) to produce an error voltage; a second arithmetic means (33) for receiving the error voltage from the first arithmetic means (32) and a voltage command value from the voltage command value setting means (29) to produce a voltage corrected command value; and a PWM signal generator (12) for receiving the voltage corrected command value from the second arithmetic means (33) and a frequency command value commanding a frequency command value from the inverter circuit to create a PWM signal for driving the inverter circuit.

19 Claims, 14 Drawing Sheets

FORCING STATE

REGENERATIVE STATE $V(*) = K \cdot F(*) + V0$

VOLTAGE TYPE INVERTER DEVICE AND METHOD OF CONTROLLING THE SAME

BACKGROUND OF THE INVENTION

1. Field of the Invention

The present invention relates to a voltage type inverter for inverting a DC voltage into an AC voltage and a method of controlling it. More particularly, the present invention relates to a voltage type inverter which gives an output voltage setting command to an inverter circuit having a switching element subjected to pulse width modulation and a method of controlling it.

2. Description of the Related Art

FIGS. 12 to 15 show a prior art. FIG. 12 shows a well-known voltage type inverter device disclosed in JP-A-60-26496. In FIG. 12, reference numeral 1 denotes an A. C. power source; 2 a converter circuit for rectifying the AC power from an AC power source; 3 a smoothing capacitor for smoothing the DC voltage from the converter circuit 2; 4 an inverter circuit for inverting the DC voltage from the smoothing capacitor into an AC voltage having a predetermined frequency; and 5 an induction motor (IM) which is load driven by the inverter circuit 4.

Reference numeral 10 denotes a signal input terminal for receiving a frequency command value F (*) which is a voltage signal corresponding to an output frequency as an output frequency setting signal; 11 an F/V arithmetic unit for creating a voltage command value V (*) having a predetermined relationship with the frequency command value as shown in FIG. 13; and 12 a PWM signal generator for receiving the frequency command value F (*) and the voltage command value (*) to generate a predetermined signal for controlling a switching element of the inverter circuit 4.

An explanation will be given of the operation of the voltage inverter device. During a low speed running, in order to compensate for the reduction in an excited current, as shown in FIG. 13, the voltage command value (*) at the frequency command value F(*) of 0 is enhanced by an offset value V0 to satisfy the following equation.

$$V(*) = K \cdot F(*) + V0$$

where K is a proportional constant.

In a configuration in which speed control is not carried out as in the prior art, because of small generated torque, as load torque increases, the speed is apt to decrease. In order to obviate this, the offset value V0 is set for a large value to strengthen excitation so that sufficient torque can be generated and hence even when the load torque is large, the speed is not reduced. However, when the excitation is strengthened to set the F/V characteristic in this way, excess excitation results in no load so that a current with no load is extremely increased to generate an excess current.

In order to obviate such a defect, control of slip frequency has been adopted conventionally. FIG. 14 shows a voltage type inverter device using the slip frequency control shown in JP-A-63-144795. In FIG. 14, reference numeral 6 denotes a Hall CT (current transformer) arranged on the DC power line of the inverter circuit 4; 7 Hall CTs for detecting three-phase line currents I (U), I (V) and I (W) to the induction motor; 8 a voltage sensor for sensing the DC input voltage V (DC) to the induction motor; and 9 is a voltage sensor for sensing the line-to-line voltage V (UW) of the induction motor 5.

Reference numeral 13 denotes a slip estimator which receives the DC input voltage V (DC) from the voltage sensor 8, line-to-line input voltage V (UW) from the voltage sensor 9, DC current I (DC) from the Hall CT 6, three phase line-to-line currents I (U), I (V) and I (W) from the Hall Cts 7 to produce a secondary input P2 to the induction motor 5 and a slip frequency estimated value Fs. Reference numeral 14 denotes a voltage corrected amount determiner which receives the secondary input P2 from the slip estimator 13 to produce an output voltage corrected amount ΔV1. Reference numeral 15 denotes an adder which adds the rotary speed command value Fr(*) from the signal input terminal 10 and the slip frequency estimated value Fs from the slip estimator 9 to produce a frequency command value F (*). Reference numeral 16 denotes an adder which adds the output voltage corrected value ΔV1 from the voltage corrected amount determiner 14 and the voltage command value V (*) from the F/V arithmetic unit 11 to create a corrected voltage command V1 (*).

An explanation will be given of the operation of the inverter device of FIG. 14. By the adder 15, the rotary speed command value Fr (*) inputted from the signal input terminal 10 is added to the slip frequency estimated value to produce the frequency command value F (*). The frequency command value F (*) is supplied to the F/V arithmetic unit 11 to create the voltage command value V (*). By the adder 16, the voltage command value V (*) is added to the output voltage corrected value ΔV1 from the voltage corrected amount determiner 14 to create the corrected voltage command value V1(*). The PWM signal generator 12 generates the PWM signal for controlling the switching element of the inverter circuit 4 on the basis of the frequency command value F (*) and the corrected voltage command value V1 (*) to drive the induction motor 5 with a prescribed F/V characteristic.

FIG. 15 shows the detailed configuration of the slip estimator 13. In FIG. 15, reference numeral 20 denotes an IM primary input arithmetic unit for computing a primary input power P1 on the basis of a DC current I (DC) from the Hall CT 6 and the DC input current voltage V (DC) from the voltage sensor 8. Reference numeral 21 denotes a current effective value arithmetic unit for computing an input current effective value I1 on the basis of the three-phase line currents I (U), I (V) and I (W) from the Hall CT 7. Reference numeral 22 denotes a voltage effective value arithmetic unit for computing the input voltage effective value VI on the basis of the line-to-line input voltage V (UW) from the voltage sensor 9. Incidentally, although the current effective value arithmetic unit 21 performs the computation on the basis of the three-phase line currents, it may perform the computation on the basis of the two-phase line currents.

Reference numeral 23 denotes an IM primary copper loss arithmetic unit for computing a primary copper loss W1 of the induction motor 5 from the input current effective value I1. Reference numeral 24 denotes an IM iron loss arithmetic unit for computing an iron loss W0 of the induction motor on the basis of the input current effective value I1 and the input voltage effective V1. Reference numeral 26 denotes an arithmetic unit for subtracting the primary copper loss W1 and iron loss W0 added by the adder 25 from the primary input power P1 to create a secondary input P2. Reference numeral 27 denotes a slip frequency arithmetic unit for computing the slip frequency estimated value Fs on the basis of the secondary input P2.

The prior art for controlling the output voltage from the voltage type inverter by the PWM system is disclosed in JP-A-59-153467 and JP-A-1-99478 in which the output from the inverter device is compared with a sine wave reference voltage and is controlled on the basis of a difference therebetween.

In a control circuit for the prior art voltage type inverter device as described above, since the output voltage from the inverter device is controlled in comparison to the sine wave reference voltage, a difference between the reference sine wave and an actual output voltage does not become zero completely so that a difference in an amplitude and a phase occurs and a normal difference remains. If a sinusoidal wave oscillator for providing a control difference is not inserted in a control system, unbalance in the output voltage or a phase shift due to unbalance in load or voltage or variation in the circuit constant cannot be compensated for.

In a system in which a slip is estimated without directly detecting the speed of an induction motor and using a constant on the primary side of the induction motor like a sensor-less spectrum control, particularly in control in a low speed area, errors in the output voltage occur due to the detecting accuracy of a voltage and a current, short-circuit preventing time of a switching element of the inverter circuit and the "on" voltage of the switching element. This impairs the control characteristic.

SUMMARY OF THE INVENTION

The present invention has been completed in order to solve the above problem, and therefore an object of the present invention is to provide a voltage type inverter device which can provide an output voltage in accordance with a voltage command and method of controlling it.

In accordance with the present invention, there is provided a voltage type inverter device provided with an inverter circuit connected across a DC power supply for generating a DC voltage to convert the DC voltage into an AC voltage having a predetermined voltage and frequency, characterized by comprising: a 1/2 V(DC) detecting circuit for detecting a voltage between one end of said DC power supply and an output from said inverter circuit; a voltage command value setting means for commanding an output voltage from said inverter circuit; a first arithmetic means for receiving the voltage command value from the voltage command value setting means and the detected voltage from said 1/2 V (DC) detection circuit to produce an error voltage; and a second arithmetic means for receiving the error voltage from said first arithmetic means and a voltage command value from the said voltage command value setting means to produce a voltage corrected command value.

Said first arithmetic means receives a voltage command value in the form of a pulse signal from said voltage command value setting means and the detected voltage in the form of a pulse signal from said 1/2 V(DC) detecting circuit to produce an error voltage in the form of a pulse signal.

A pulse waveform of said error voltage from said first arithmetic means is created in such a manner that the pulse waveform of the voltage command value from said voltage command value setting means and that of the detected voltage from the 1/2 V (DC) detection circuit are instantaneously compared to each other to remove the difference created by both pulse waveforms.

The voltage type inverter device according to the present invention further comprises: a PWM signal generator for receiving the voltage corrected command value from said second arithmetic means and a frequency command value commanding a frequency command value from said inverter circuit to create a PWM signal for driving said inverter circuit.

The voltage type inverter device according to claim 4, characterized in that said frequency command value supplied to said PWM signal generator is a fixed frequency.

Said frequency command value supplied to said PWM signal generator is a frequency command varying in a predetermined relationship with a voltage command value from said voltage command value setting means.

The voltage type inverter device according to the present invention further comprises a slip estimator for receiving an AC current supplied to an induction motor connected to said inverter circuit and the detected voltage from said 1/2 V to create a slip frequency estimated value for said induction motor; a third arithmetic means for receiving a voltage command from the voltage command value setting means to create a frequency command varying a predetermined relationship with the voltage command value; and a fourth arithmetic means for receiving the frequency command from the third arithmetic means and the slip frequency estimated value from said slip estimator to create a corrected command frequency, wherein said corrected command frequency is a frequency command value for said PWM signal generator.

The voltage-type inverter device according to the present invention further comprises a third arithmetic means for receiving a voltage command from the voltage command value setting means to create a frequency command varying a predetermined relationship with the voltage command value; a fourth arithmetic means for receiving a frequency command set from an external device to create the voltage command value varying in a predetermined relationship with the frequency command value; a PWM signal generator for receiving a voltage command value and a frequency command value to produce a PWM signal for driving said inverter circuit; and a switching means for switching the voltage command value and frequency command value for the PWM signal generator between the case where they are the voltage corrected command value from the second arithmetic means and the frequency command from the third arithmetic means and the case where they are voltage command value from the fourth arithmetic means and the frequency command value from the external device.

The voltage-type inverter device according to the present invention further comprises: a third arithmetic means for receiving a voltage command from the voltage command value setting means to create a frequency command varying a predetermined relationship with the voltage command value; a slip estimator for receiving an AC current supplied to an induction motor connected to said inverter circuit and the detected voltage from said 1/2 V (DC) detection circuit to create the slip frequency estimated value for said induction motor and a secondary input to said induction motor; a fourth arithmetic means for receiving the slip frequency estimated value from the slip estimator the frequency command from said third computing to create a corrected command frequency; a fifth arithmetic means for receiving the command value set by the external device and the slip frequency estimated value by the slip estimator; a sixth arithmetic means for receiving the frequency command from the fifth arithmetic means to produce a voltage command varying in a predetermined relationship the frequency command; a voltage corrected amount determiner for receiving a secondary input from said slip estimator to create a voltage corrected amount; a seventh arithmetic means for receiving the voltage corrected value from said voltage correction determiner and the voltage command from said sixth arithmetic means to create a voltage corrected value; a PWM signal generator for receiving the voltage command value and the frequency to create a PWM signal for driving the inverter; and a switching means for switching the voltage command value and frequency command value for the PWM signal generator between the case where they are the voltage corrected command value from the second arithmetic means and the frequency command from the fourth arithmetic means and the case where they are the voltage command value from the seventh arithmetic means and the frequency command value from the fifth computing means.

Each of an upper arm switching element and a lower arm switching element includes individually said 1/2 V (DC) detection circuit, said first computing means, said second computing means, and the PWM signal generator for generating a PWM signal on the basis of the command from the second computing means.

For each of output phase of said inverter circuit, a single module is constituted by said 1/2 V (DC) detection circuit, said first computing means, said second computing means, said PWM signal generator, said upper arm switching element and said lower arm switching element.

Further, in a method of controlling a voltage type inverter device provided with an inverter circuit connected across a DC power source for generating a DC voltage and serving to convert the DC current into an AC voltage having a predetermined voltage and frequency, the voltage between one end of said DC power and the output from said inverter circuit is detected, an error voltage is created on the basis of the detected voltage and a voltage command for commanding the output voltage from the inverter circuit, and a voltage corrected command value is created on the basis of the error voltage and said voltage command value.

Since the detected voltage, voltage command value and error voltage are a pulse signal, respectively, the voltage command value and the detected value are digitally compared with each other.

The pulse waveform of the error voltage is created in such a manner that the pulse waveform of said voltage command value and the pulse waveform of said detected voltage are instantaneously compared with each other, and the error generated by both pulse waveforms is removed.

A PWM signal is created on the basis of said voltage corrected command value and the frequency command value for commanding the output frequency from the inverter circuit.

A slip frequency estimated value is created from the AC current supplied to an induction motor connected to said inverter circuit, a frequency command varying in a predetermined relationship with said voltage command value, a corrected command frequency is created from the frequency command and said slip frequency estimated value, and a PWM signal for driving said inverter circuit is created on the basis of the corrected command frequency.

A first frequency varying in a predetermined relationship with said voltage command value, a second voltage command value varying in a predetermined relationship with a frequency command value set by an external device, and a PWM signal for driving said inverter circuit is switched between the case where it is created from said voltage corrected command value and said first frequency command and the case where it is created set by the external device and the said second voltage command value.

A frequency command varying in a predetermined relationship with said voltage command voltage, a slip frequency estimated value of said induction motor and a secondary input to said induction motor are created from the AC current supplied to an induction motor connected to said inverter circuit and said detected voltage, a first corrected frequency is created from said slip frequency estimated value and the frequency command varying in a predetermined relationship with said voltage command value, a second corrected command frequency is created from the frequency command value set by the external device and said slip frequency estimated value, a voltage command varying in a predetermined relationship with the second corrected command frequency is created, a voltage corrected value is created from the secondary input to said induction motor, a second voltage corrected command value is created from the voltage corrected value and said voltage command from said second corrected command frequency, and the PWM signal for driving said inverter circuit is switched between the case where it is created on the basis of the voltage corrected command value and said first corrected command frequency and the case where it is created on the basis of said second voltage corrected command value and said second corrected command frequency.

For each of the upper arm switching element and lower arm switching element of said inverter circuit, the voltage between the one end of said DC power source and the output from said inverter is detected, an error voltage is created from each detected voltage and the voltage command value commanded by the upper arm switching element and the lower arm switching element, and the voltage corrected command value corresponding each of the switching elements is created from each error voltage and said voltage command value.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

Embodiment 1

Figure 1:
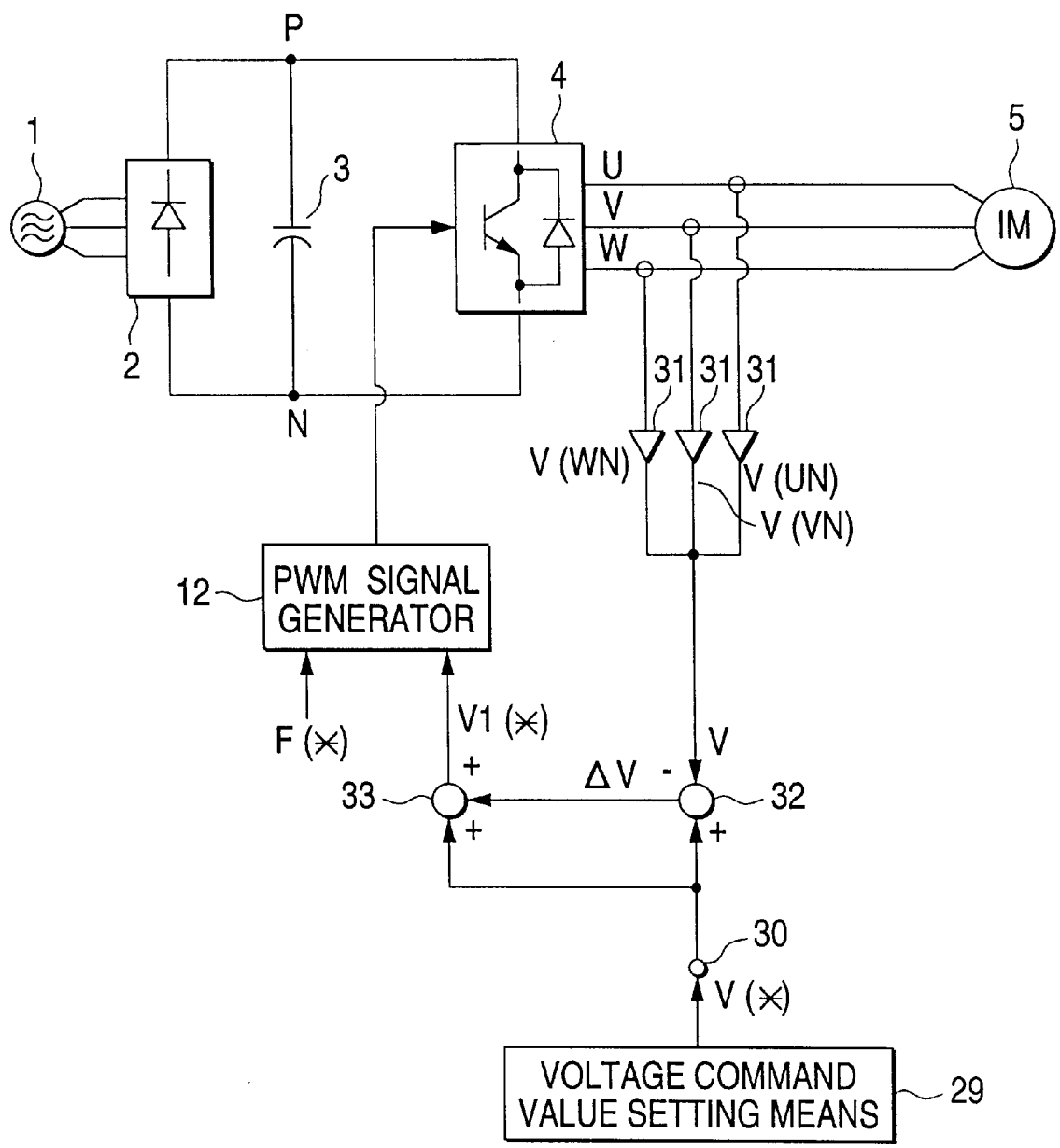
FIG. 1 is a block diagram of a control circuit for a voltage-type inverter device according to a first embodiment of the present invention.

Now referring to FIGS. 1 to 5, an explanation will be given of an embodiment of the present invention. FIG. 1 is a first block diagram of a control circuit for controlling a voltage and a frequency in response to a voltage setting command. In these figures, like reference numerals refer to like elements in the prior art. Reference numeral 30 denotes a signal input terminal for receiving a voltage command value V (*) which is a command value from the output voltage for an inverter circuit 4. It should be noted that the voltage command value (*) setting means is supplied from a voltage command value setting means provided externally.

Reference numeral 31 denotes one of plural 1/2 V(DC) detection circuits each for detecting a voltage between each output line of the inverter circuit 4 and the negative terminal N of a capacitor 3. Reference numeral 32 denotes a subtractor for comparing the voltage command value V (*) and the output voltage V detected by the 1/2 V(DC) detection circuit 31 to create an error voltage ΔV. Reference numeral 33 denotes an adder for the voltage command value V (*) and the error voltage Δ(*) to create a voltage corrected command V1 (*).

Figure 2:
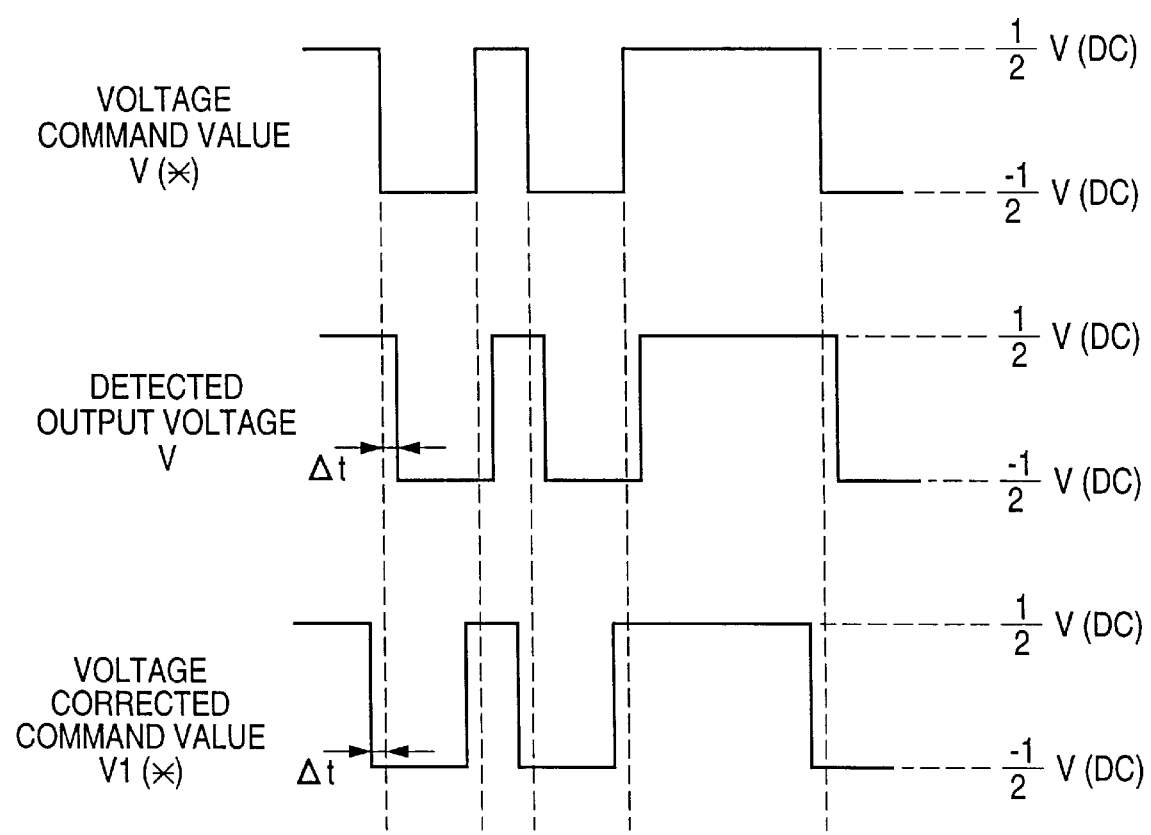
FIG. 2 is a graph showing a voltage command value, detected output voltage and voltage corrected command value according to the first embodiment of the present invention.

The relationship among the voltage command value V(*), detected output voltage of the 1/2 V (DC) detection circuit 31 and voltage corrected command value V1 (*) is shown in FIG. 2. The voltage command value V(*) is a reference PWM signal and the detected output voltage V from the 1/2 V(DC) detection circuit 31 is also the PWM signal. As seen from FIG. 2, the detected output voltage V is delayed by Δt from the voltage command value V(*) so that the voltage corrected command value V1 (*) corresponding to this delay occurs. In order to correct the error voltage, the voltage corrected command value V1(*) advanced by Δt from the voltage command value V (*) is generated. This intends to compare the voltage command value V(*) with the detected output voltage V from the 1/2 V(DC) detection circuit 31 instantaneously to make the difference therebetween zero.

Figure 5:
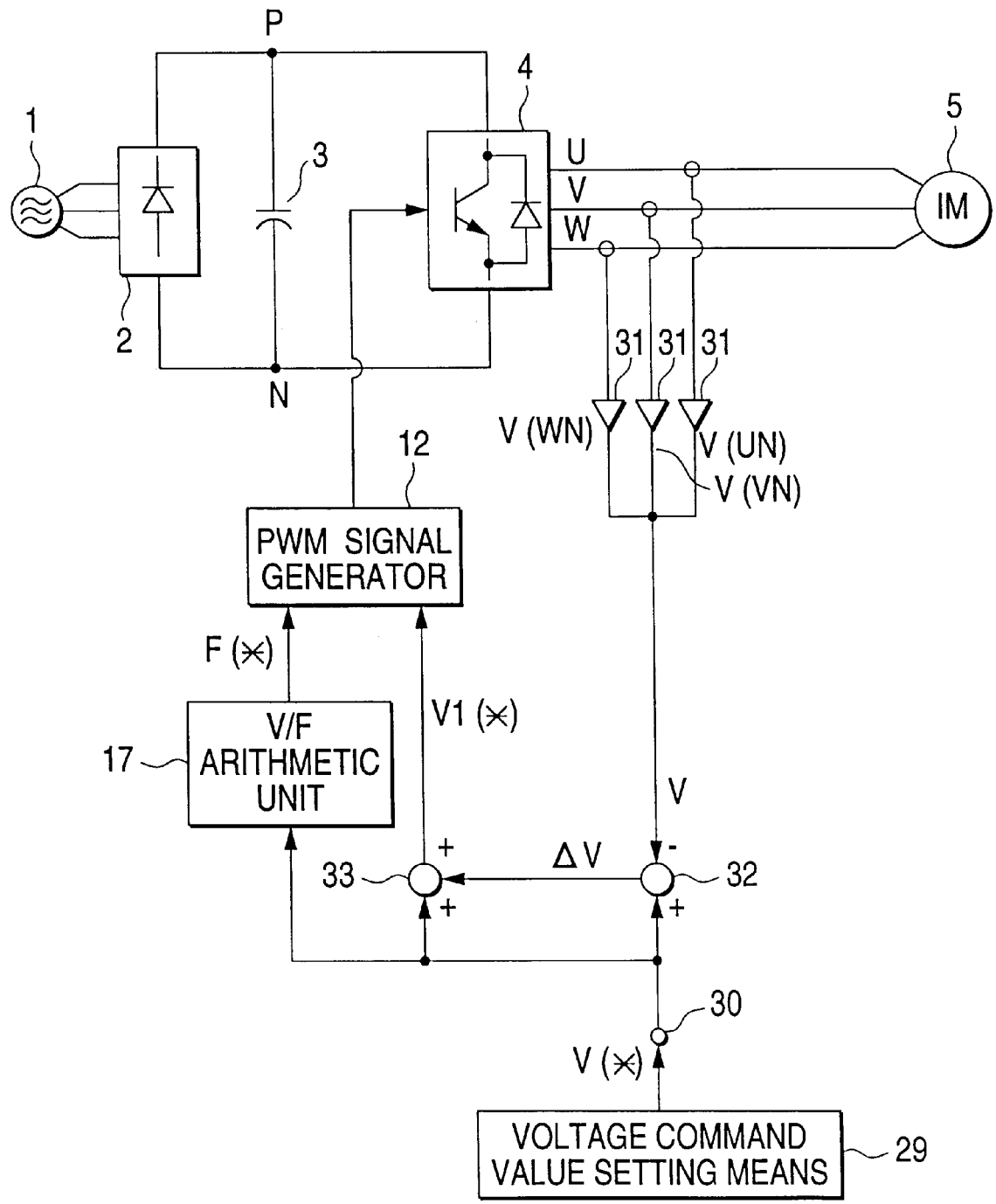
FIG. 5 is a block diagram of a variable-voltage variable frequency inverter device according to the first embodiment of the present invention.

Thus, in FIG. 1, when the output voltage from the inverter 4 is reduced owing to a change in the load of an induction motor 5, the error voltage created by the detected output voltage from the 1/2 V(DC) detection circuits 31 and the voltage command value V (*) is increased. This increases the corrected command value V1 (*) (V1(*)=V+ΔV). Thus, the detected output voltage V is controlled so that it becomes constant. As for the frequency command value F (*) which is another input to the PWM signal generator 12, as shown in FIG. 5, a predetermined relationship is given between the frequency command value F(*) and the voltage command value to provide a variable-voltage variable-frequency inverter device. Incidentally, reference numeral 17 denotes a V/F arithmetic unit for producing the frequency command value F (*) in response to the voltage command value V (*). Further, setting the frequency command value F(*) for a constant value can provide a constant-voltage constant-frequency inverter device.

Figure 3:
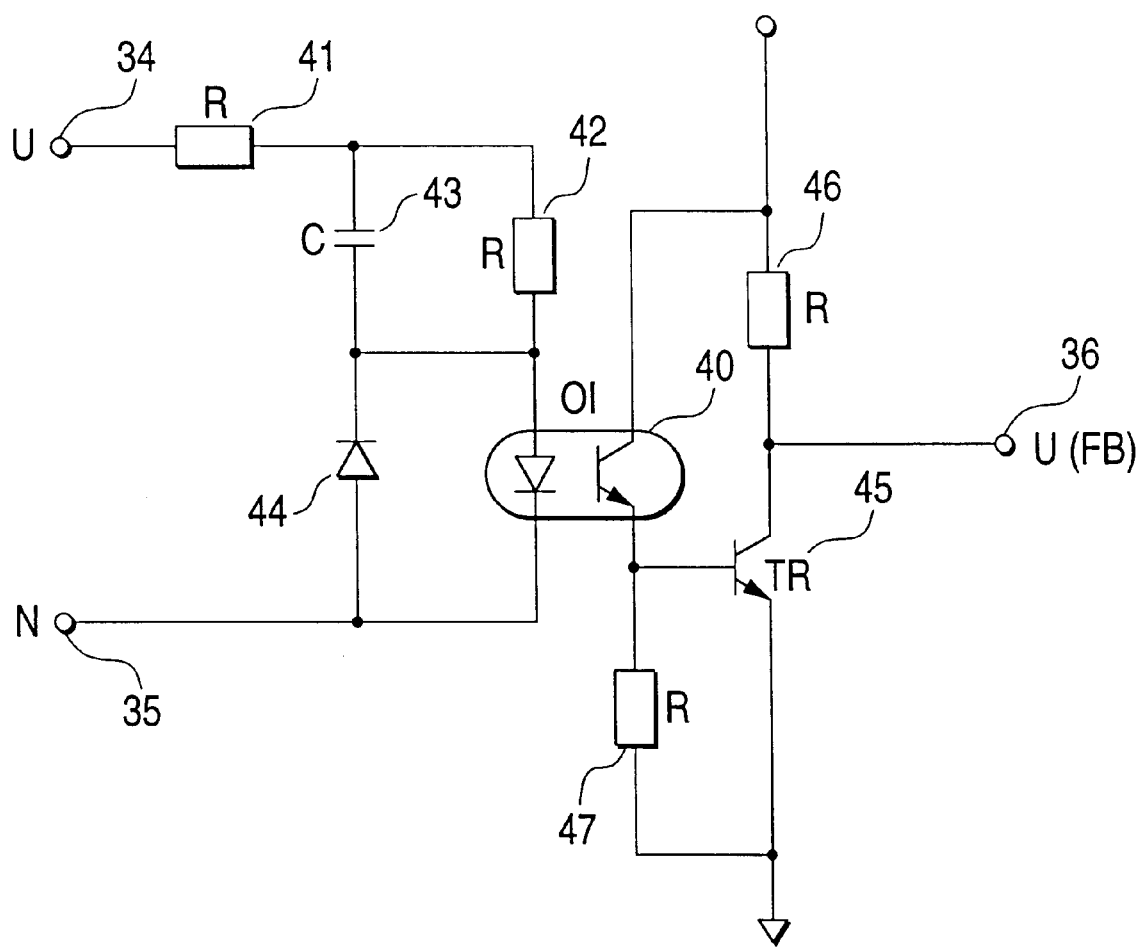
FIG. 3 is a view showing the configuration of a 1/2 V(DC) detection circuit according to the first embodiment of the present invention.
Figure 4:
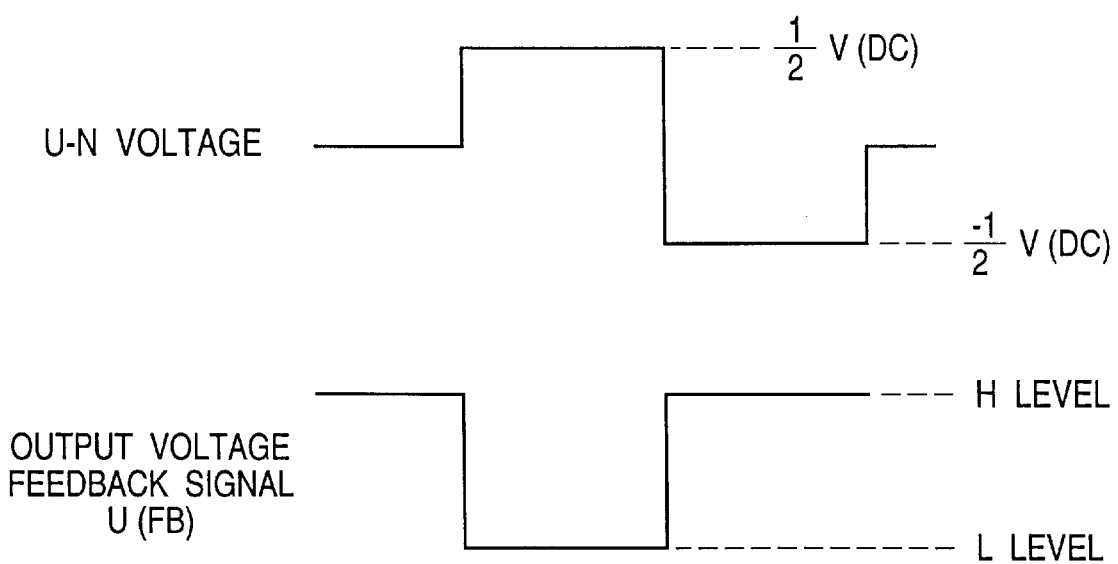
FIG. 4 is a graph showing the operation of the 1/2 V(DC) detection circuit according to the first embodiment of the present invention.

Referring to FIGS. 3 and 4, an explanation will be given of the configuration and operation of the 1/2 V (DC) detection circuit 31. Now, an explanation will be given of the 1/2 V (DC) detection circuit 31 for a single U phase. In these figures, reference numeral 34 denotes a detection terminal connected to a U-phase output line of the inverter circuit 4; 35 a detection terminal connected to the negative terminal N of the capacitor 3; and 40 a photo-coupler connected to both terminals 34 and 35 to detect the U-phase output voltage.

Reference numerals 41 and 42 denote resistors connected to the primary side of the photo-coupler 40 and serving to limit the current flowing into the photo-coupler 40. Reference numeral 43 denotes a capacitor for preventing the erroneous operation by noise. Reference numeral 44 denotes a diode for preventing the photo-coupler from being reverse-biased. The resistors 41 and 42 are divided into two parts to prevent the heat generation by the resistors and a surge voltage from being concentrated. Reference numeral 45 denotes a switching capacitor connected to the secondary side of the photo-coupler 40 to produce an output voltage feedback signal U (FB) at a signal output terminal 36. Reference numeral 46 denotes a resistor for limiting the current flowing into the switching transistor 45. Reference numeral 47 denotes a bias resistance for the switching transistor 45.

The detection circuit produces +V(DC)/2 or −V (DC)/2 at the U-phase voltage of the detection terminal 34 on a base of the potential at the point N of the detection terminal 35. Now if the voltage at the detection terminal 34 becomes +V (DC)/2, a current flows into the primary side of the photo-coupler 40 to turn on so that the current flows toward the secondary side. Thus, the switching transistor 45 turns on so that the output voltage feedback signal U (FB) at the signal output terminal 36 becomes an "L" level. Conversely, when the voltage at the detection terminal 34 becomes −V (DC)/2, the current does not flow toward the primary side of the photo-coupler 40. Then, the current does not flow toward the primary side of the photo-coupler 40 so that the photo-coupler 40 does not turn on and hence the current does not flow toward the secondary side. As a result, the switching transistor 45 does not turn on so that the output voltage feedback signal U (FB) at the output voltage terminal 36 becomes an "H" level.

As described above, when the U-phase terminal 34 produces +V(DC)/2, the output voltage feedback signal U(FB) at the signal output terminal 36 becomes "L" level, and when the U-phase terminal 34 produces −V(DC)/2, the output voltage feedback signal U(FB) at the signal terminal 36 becomes "H" level. Thus, the output voltage at the U-phase can be detected.

In the above explanation, although the 1/2 V (DC) detection circuit 31 detects the voltage between the negative terminal N of the capacitor 3 and each of the outputs from the inverter 4, it may detect the voltage between the positive terminal P and each of the outputs from the inverter 4. In this case, it should be noted that the polarity of the detected voltage is inverted.

As described above, in accordance with this embodiment, the voltage command value is not acquired by the arithmetic operation for the frequency command value, but is given directly. Thus, the detected voltage can be precisely controlled in accordance with the command value. Further, the 1/2 V (DC) detection circuit is used to provide the output voltage feedback signal U (FB) which is an on/off pulse signal, and on the basis of the difference (Δt) between the output voltage feedback signal U (FB) and the voltage command value (V(*)) which is a PWM reference signal, the pulse width modulation is carried out. Thus, the output voltage from the inverter circuit 4 can be caused to follow the command voltage accurately. Accordingly, very accurate control is given to the application of constant voltage control requiring an accurate voltage value at the output from the inverter circuit 4.

Embodiment 2

Figure 6:
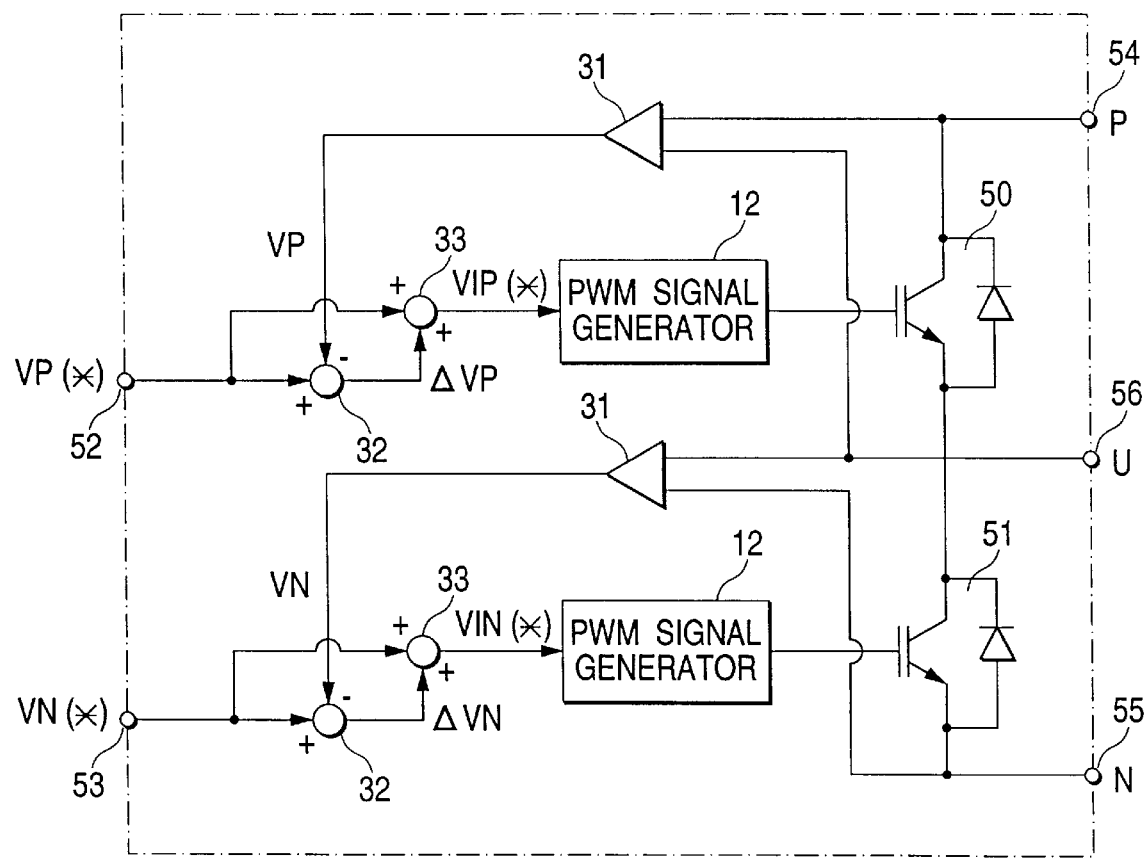
FIG. 6 is a block diagram showing a module of upper and lower arm switching elements and their control circuits according to a second embodiment of the present invention.

Now referring to FIGS. 6 and 7, an explanation will be given of the second embodiment. FIG. 6 shows a circuit configuration of an inverter unit including a voltage control circuit using switching elements connected vertically in series and the 1/2 V(DC) detection circuit is incorporated. The series connection of the switching elements are a set of an upper arm switching element and a lower arm switching element to which the output voltage control described in connection with Embodiment 1 is applied.

In FIG. 6, like reference numerals refer to like or corresponding parts in the prior art or the first embodiment. Reference numeral 50 denotes an upper arm switching element with a diode anti-parallel connected; 51 a lower arm switching element with a diode anti-parallel connected; 52 an input terminal of the voltage command value VP (*) in the upper arm switching element; 53 an input terminal of the voltage command value VN (*) in the lower arm switching element; 54 a positive terminal P; 55 a negative terminal N; and 56 a U-phase output terminal.

Figure 7A:
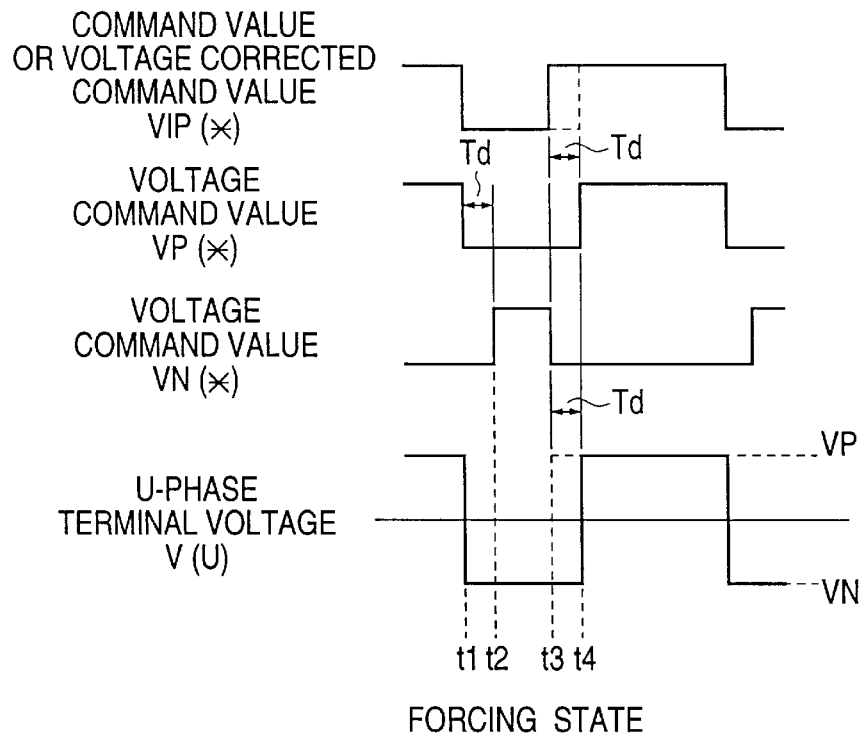
FIGS. 7A and 7B are timing charts of an PWM command value, voltage command value and U-phase terminal voltage in the second embodiment of the present invention.
Figure 7B:
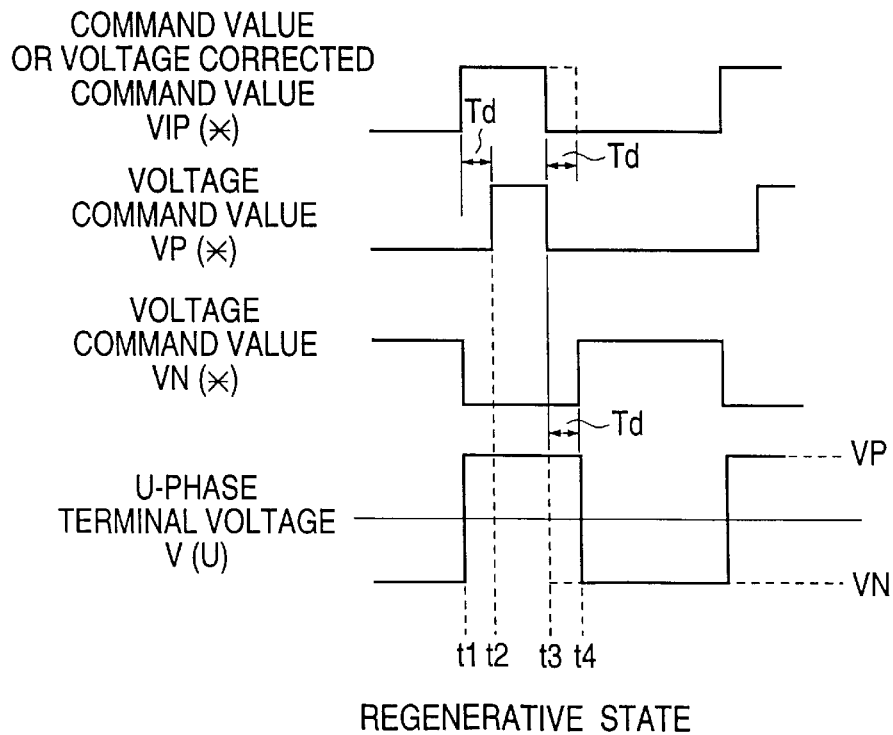

FIGS. 7A and 7B are timing charts showing the relationship among a PWM command value or voltage corrected command value (V1P(*)), a voltage command value (VP (*)), a voltage command value (VN(*)) and a U-phase terminal voltage (V(U)). FIG. 7A shows the case where the induction motor 5 controlled by the inverter circuit 4 is in a forcible state and FIG. 7B shows the case where it is in a regenerative state.

In the circuit of FIG. 6, the switching elements 50 and 51 cannot be turned on or off in accordance with the waveform of the PWM signal which is generally ideal for an actual inverter. Therefore, in order to prevent the upper and lower arms from being short-circuited, at a predetermined time lapsed after either one of the voltage command value VP (*) and the voltage command value VN (*) is turned off, another voltage command value is turned on. The predetermined time is referred to "upper-lower arm short-circuiting preventing time" that is represented by Td.

For example, in the forcible state as shown in FIG. 7A, a current flows from the U-phase output terminal 56 to the induction motor 5. At timing t1, when the voltage command value (VP(*)) becomes "off" to turn off the upper arm switching element 50, the anti-parallel diode of the upper arm switching element 50 turns "on". After Td, at timing t2, the voltage command value (VN(*)) turns on to turn on the lower arm switching element 51. Then, the U-phase terminal voltage V (U) is VN and the PWM command value is also "off" so that no error voltage occurs.

At timing t3, the PWM command value becomes "off" and the voltage command value (VN (*)) also becomes "off" to turn off the lower arm switching element 51. Then, the anti-parallel diode of the lower arm switching element 51 turns on. After Td, at timing t4, the voltage command value (VP(*)) becomes "on" to turn on the upper arm switching element 50. At timing t4, the U-phase terminal voltage V (U) becomes VP. Thus, during the period between timings t3 and t4, the PWM command value and the U-phase terminal voltage V (U) are different from a each other so that the output voltage is actually reduced. Also in the regenerative state of FIG. 7B, an error voltage occurs during the period between timings t3 and t4. In this case, as apparent from the figure, the output voltage is actually enhanced.

In order to obviate such an inconvenience, as shown in FIG. 6, for each of the upper arm switching element 50 and the lower arm switching element 51, a 1/2 V (DC) detection circuit 31, a subtractor 32, an adder 33, and a PWM signal generator 12 are provided. For the upper arm switching element 50, the 1/2 V (DC) detection circuit 31 detects a voltage between the positive terminal P54 and the U-phase output terminal 56, the subtractor 32 creates an error voltage between the voltage command value (VP(*)) and the detected voltage, and the adder 33 adds the error voltage to the voltage command value (VP (*)) to produce the voltage corrected command value (V1P(*)) that is used as a PWM command value for the PWM signal generator 12.

On the other hand, for the lower arm switching element 51, the 1/2 V (DC) detection circuit 31 detects a voltage between the negative terminal N55 and the U-phase output terminal 56, the subtractor 32 creates an error voltage between the voltage command value (VN(*)) and the detected voltage, and the adder 33 adds the error voltage to the voltage command value (VN(*)) to produce a voltage corrected command value (V1N(*)) that is used as a PWM command value for the PWM signal generator 12.

The voltage corrected command value (V1P(*)) thus created is corrected by the time of Td as shown in FIGS. 7A and 7B. Thus, the output voltage corresponding to the PWM command value can be obtained. The voltage corrected command value (V1N(*)) is corrected like the voltage corrected command value (V1P(*)) so that the output voltage corresponding to the PWM command can be obtained.

As described above, in accordance with this embodiment, for each of the upper arm switching element 50 and the lower arm switching element 51, the 1/2 V (DC) detection circuit 31, subtractor 31, adder 33 and PWM signal generator 12 are provided to control the respective switching elements individually. For this reason, the influence from the upper-lower arm short-circuiting preventing time or the on-time of the switching elements of the main circuit is removed so that the output voltage can be controlled precisely in accordance with the command value.

Further, as shown in FIG. 6, a pair of the upper and lower arm switching elements for each phase inclusive of the 1/2 V(DC) detection circuit 31, subtractor 32, adder 33 and PWM signal generator 12 can be designed in a module so that the configuration of the control circuit for the voltage type inverter device is simplified and accurate voltage control can be carried out.

Embodiment 3

Figure 8:
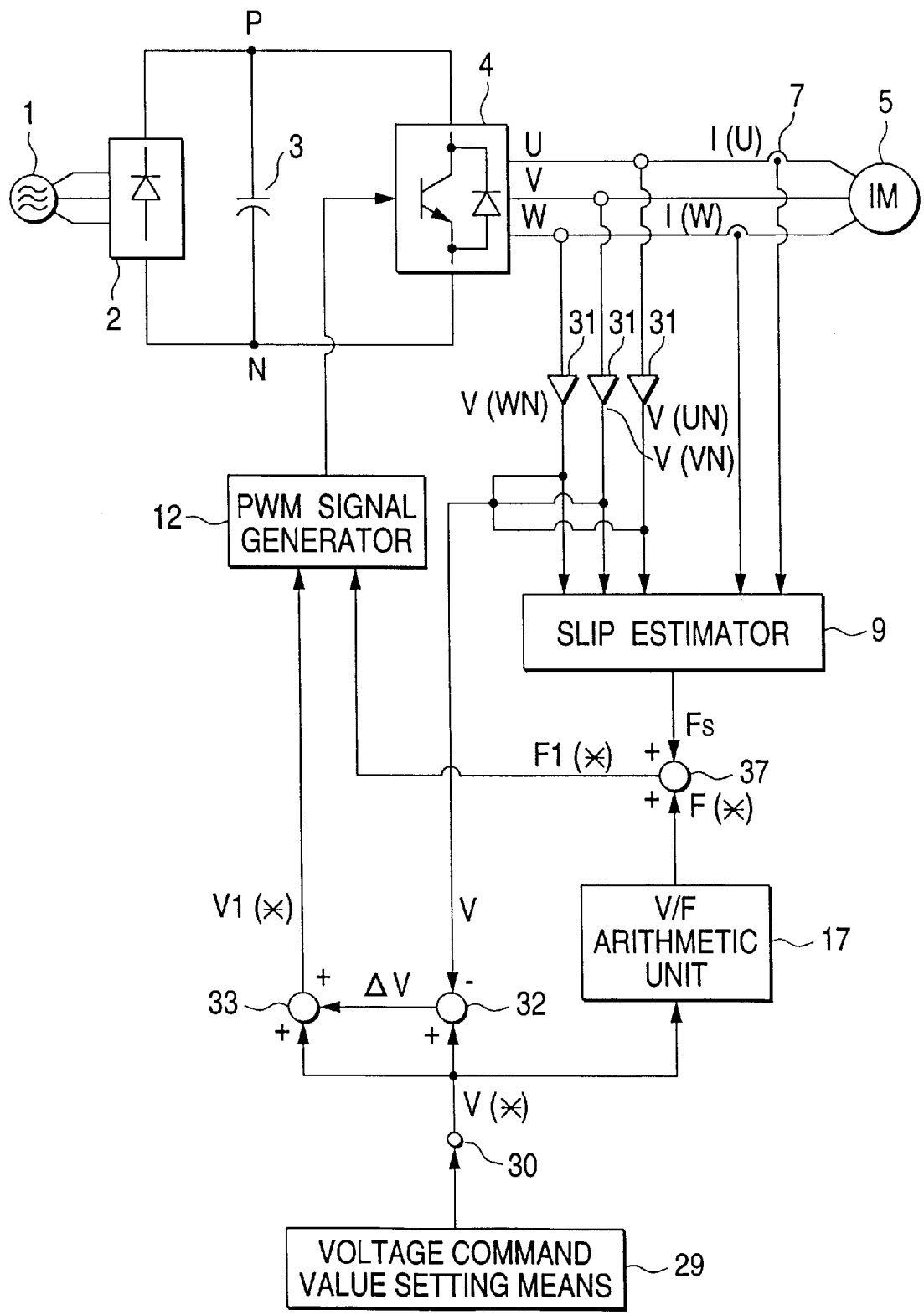
FIG. 8 is a block diagram of a variable-voltage variable frequency inverter device equipped with slip correction according to a third embodiment of the present invention.
Figure 9:
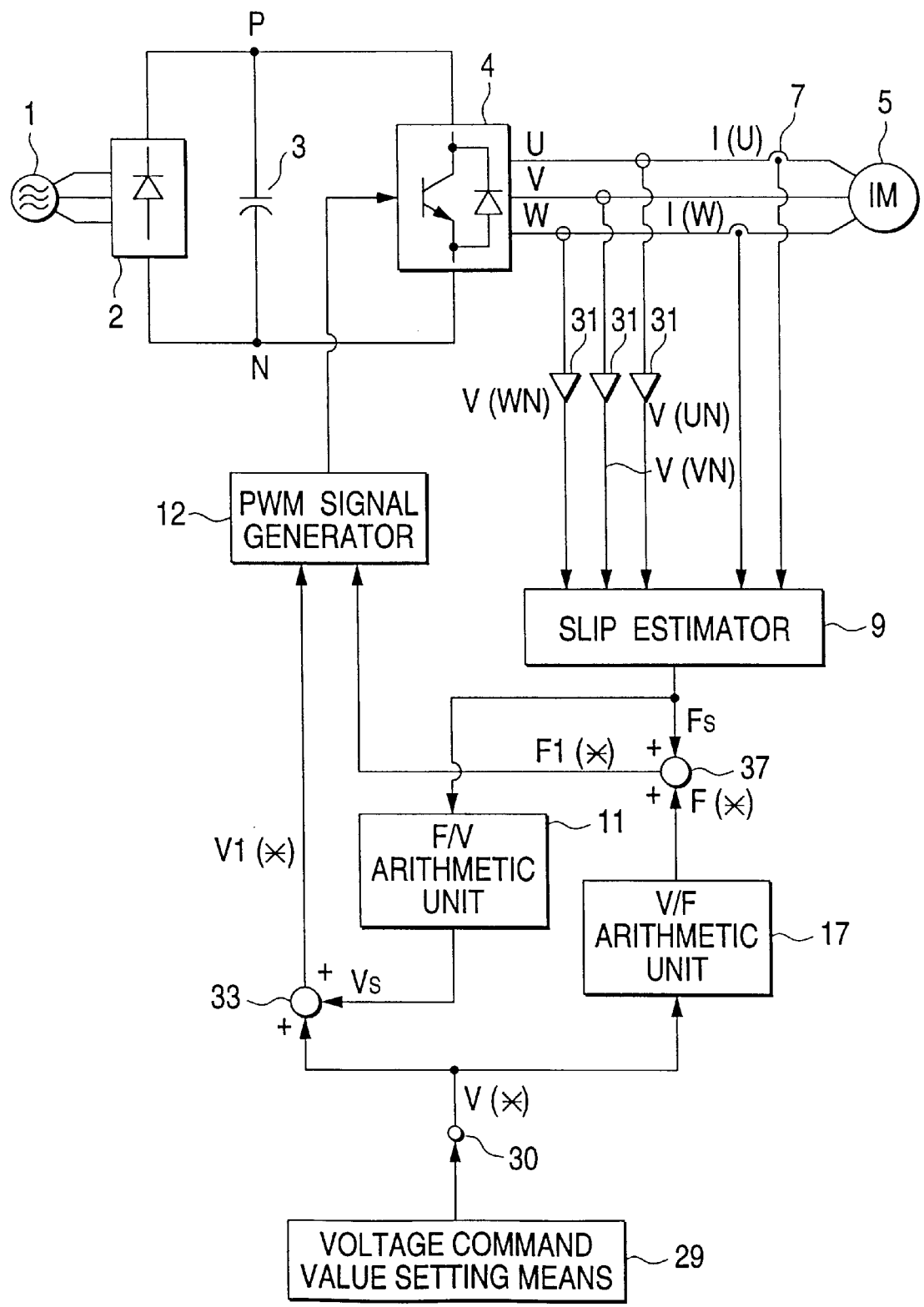
FIG. 9 is a block diagram of another variable-voltage variable frequency inverter device equipped with slip correction according to the third embodiment of the present invention.

Referring to FIGS. 8 and 9, an explanation will be given of the third embodiment of the present invention. In the embodiment shown in FIG. 8, the voltage command value V (*) inputted from the signal input terminal 30 does not correspond to the frequency command for the induction motor 5, but to the speed command therefor. In the figure, like reference numerals refer to like or corresponding parts in the prior art or the first and second embodiments. Reference numeral 37 denotes an adder for creating a corrected command frequency F1(*) from the slip estimated value Fs from the slip estimator 9 and the command frequency F(*)

corresponding to the voltage command value V(*) produced by the V/F arithmetic unit 17.

The slip estimator 9 receives the output line currents I(U) and I(W) from the inverter circuit 4 detected by the Hall CTs 7 and the output voltages V(UN), V(VN) and V(WN) detected by the 1/2 V (DC) to create a slip frequency estimated value Fs. On the other hand, the voltage command value V (*) input from the signal input terminal 30 is compared with the output voltage V from each of the 1/2 V(DC) detection circuits 31 so that the subtractor 32 creates an error voltage ΔV, and on the basis of the voltage command V (*) and the error voltage ΔV, the adder 33 creates a voltage corrected command value V1 (*) which is in turn supplied to the PWM signal generator 12.

The command frequency F(*) from the V/F arithmetic unit 17 is added to the slip frequency estimated value Fs created by the slip estimator 9 to provide a corrected command frequency F1 (*) which will be supplied to the PWM signal generator 12. Using the PWM signal from the PWM signal generator 12, the inverter circuit 4 is subjected to pulse width modulation (PWM) so that the inverter circuit 4 can produce the voltage and frequency as commanded.

On the other hand, the control system as shown in FIG. 9, the slip frequency estimated value Fs from the slip estimator 9 is added to the command frequency F(*) from the V/F arithmetic unit 17 to create a corrected command frequency F1(*). In addition, a voltage corrected value Vs corresponding to the slip frequency estimated value Fs is created by the F/W arithmetic unit 11. The voltage corrected value Vs is added to the voltage command value V(*) to create a voltage corrected value V1(*) which will be supplied to the PWM signal generator 12.

In accordance with this embodiment, the output from the inverter circuit 4 can be caused to follow the voltage command value V(*) accurately. A change in the slip attendant to an increase or decrease in the load of the induction motor can be corrected, thereby controlling the speed of the induction motor 5 accurately.

Embodiment 4

Figure 10:
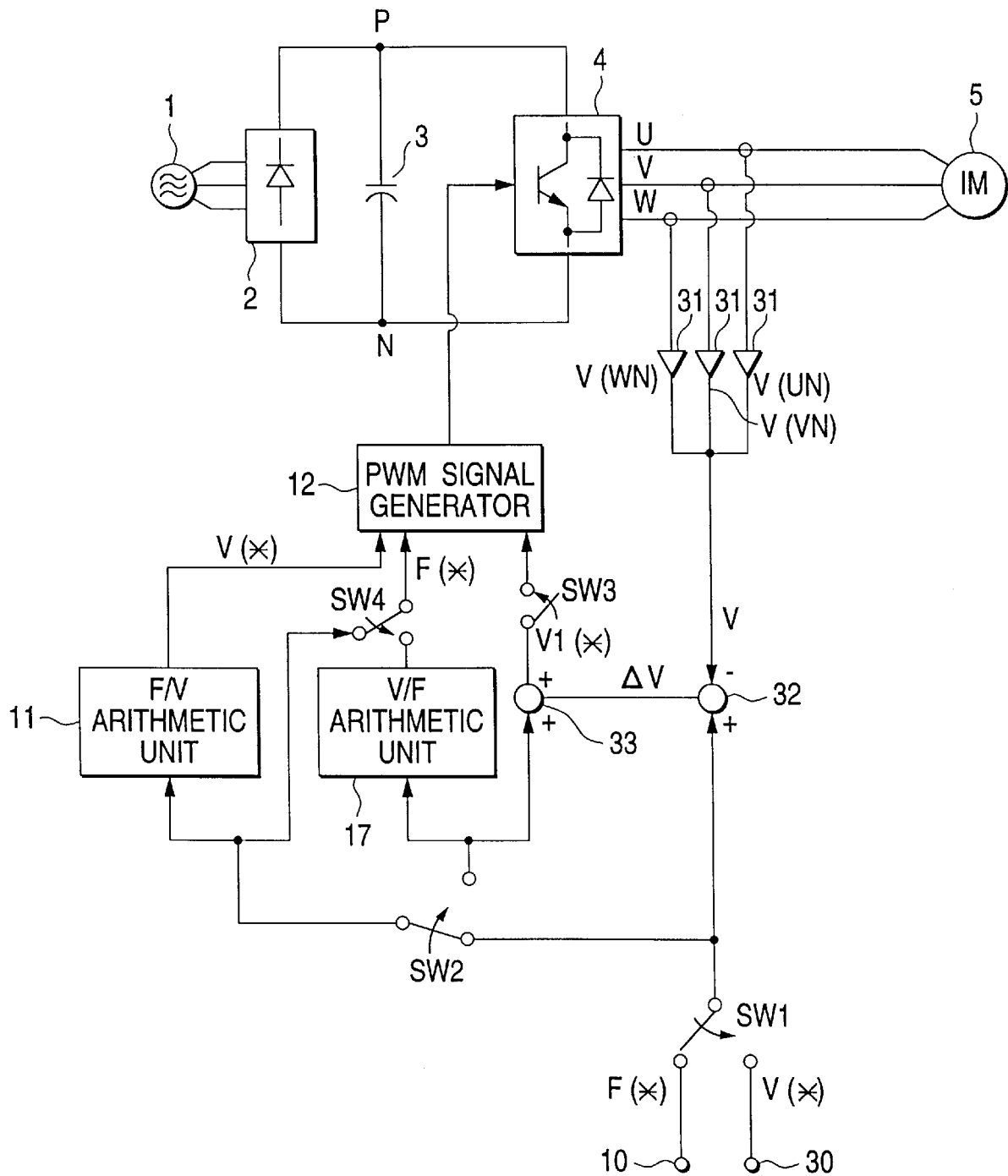
FIG. 10 is a block diagram of a voltage-type inverter device which switches the command inputting system between a voltage command value and a frequency command inputting system according to a fourth embodiment of the present invention.

Referring to FIG. 10, an explanation will be given of this embodiment. This embodiment is directed to a control circuit for a voltage type inverter device which can switch a command inputting system between a system of inputting a voltage command value and a system of another system of inputting a frequency command value. In this figure, like reference numerals refer to like or corresponding parts in the prior art or the first to third embodiments. SW1 to SW4 denote switches for switching the input system between a system of inputting a voltage command value and another system of inputting a frequency command value.

Where the frequency command value inputting system is selected, the switches SW1 to SW4 are placed in the state as shown in FIG. 10. The frequency command value F(*) inputted from the signal input terminal 10, via one way, is directly supplied to the PWM signal generator 12 as a frequency command F(*). The frequency command value F(*), via another way, is first supplied to the F/V arithmetic unit 11 serving as the fourth arithmetic unit which converts the frequency command value F(*) into a voltage command V(*) corresponding thereto and to be supplied to the PWM signal generator 12. On the basis of these frequency command F(*) and the voltage command V(*), the PWM signal generator 12 controls the inverter circuit 4.

On the other hand, where the voltage command value inputting system is selected, the switches SW1 to SW4 are placed in the state moved in the directions indicated by arrows. The voltage command value V(*) supplied from a signal input terminal 30 is compared with the output voltage V detected by the 1/2 V(DC) detection circuit 31 by the subtractor 32 serving as the first arithmetic means. The voltage command value V(*) is also added to an error voltage ΔV created by the subtractor 32 by the adder 33 serving as the second arithmetic means to create a voltage corrected command value V1 (*) to be supplied to the PWM signal generator 12. On the other hand, the voltage command value V(*) is also supplied to the V/F arithmetic unit 17 serving as the third arithmetic means to create a frequency command F(*) corresponding to the voltage command value V(*), which is supplied to the PWM signal generator 12. On the basis of these frequency command F(*) and the voltage command V(*), the PWM signal generator 12 controls the inverter circuit 4.

Thus, in accordance with this embodiment, the command inputting system can be switched between the voltage command value inputting system and the frequency command inputting system. Either command inputting system can be preferably selected in accordance with a system using the voltage type inverter device. Accordingly, the voltage type inverter device with very high flexibility can be provided.

Embodiment 5

Figure 11:
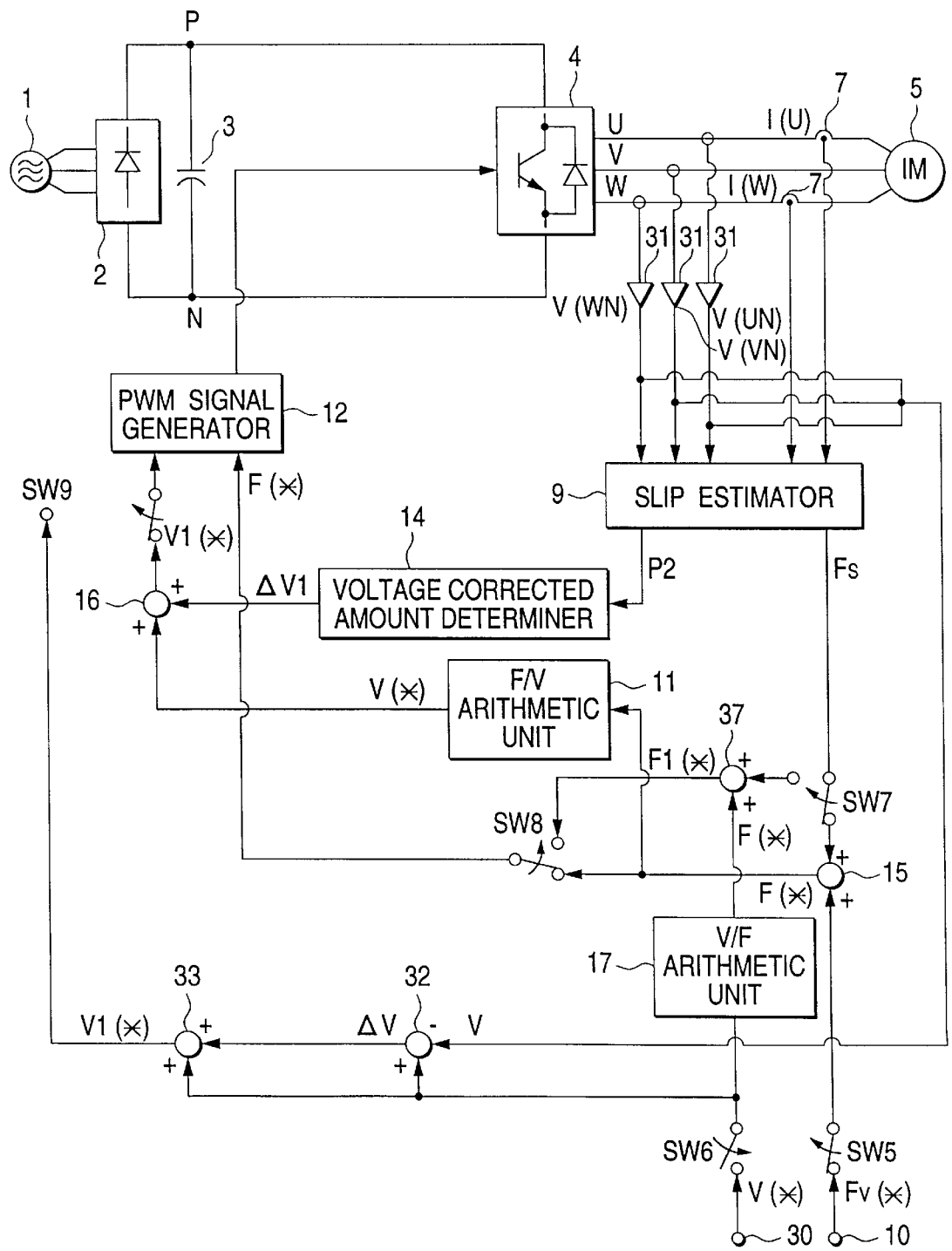
FIG. 11 is a block diagram of a voltage-type inverter device equipped with slip correction which switches the command inputting system between a voltage command inputting system and a frequency command inputting system.
Figure 12:
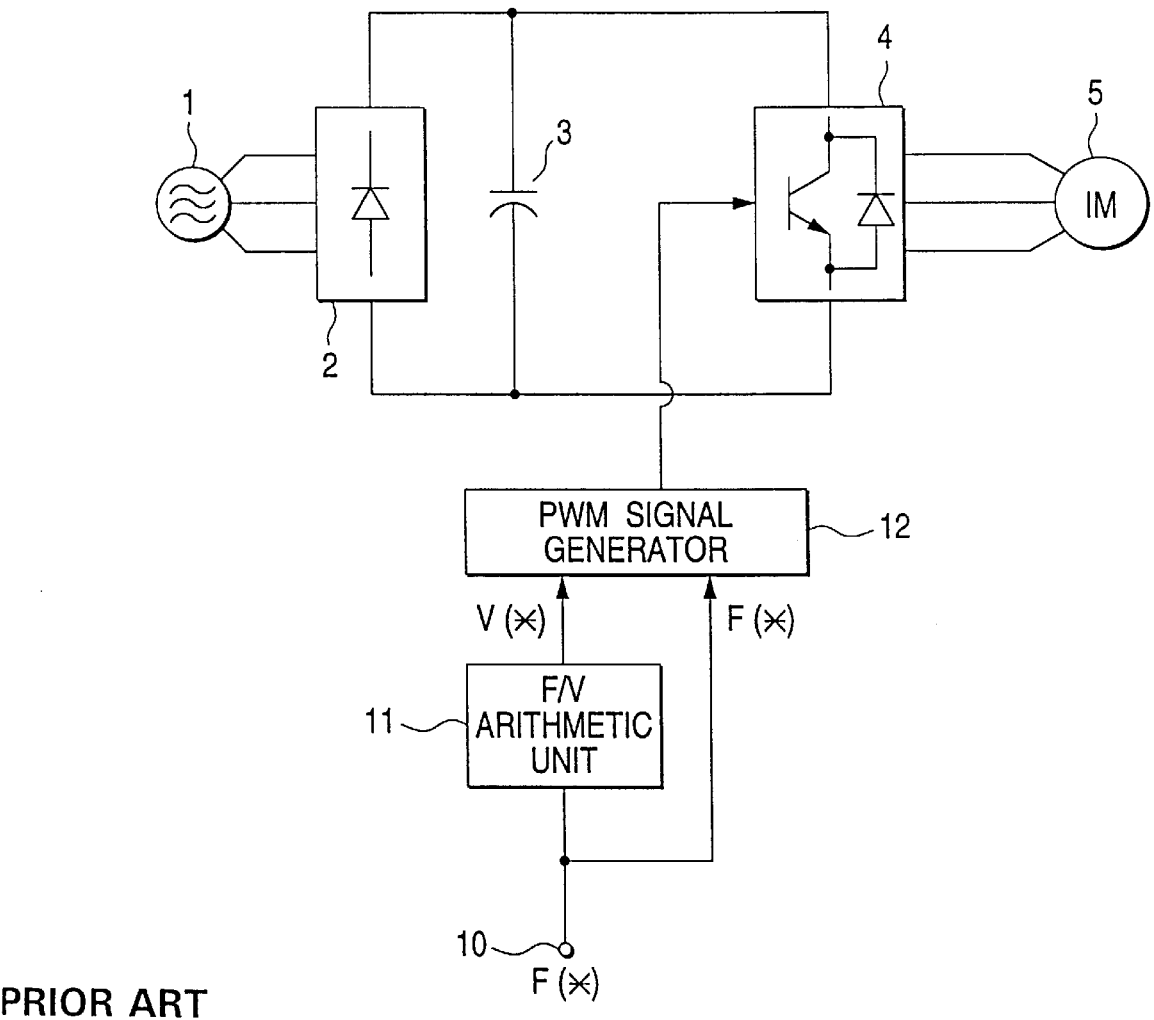
FIG. 12 is a block diagram showing a conventional voltage-type inverter device.
Figure 13:
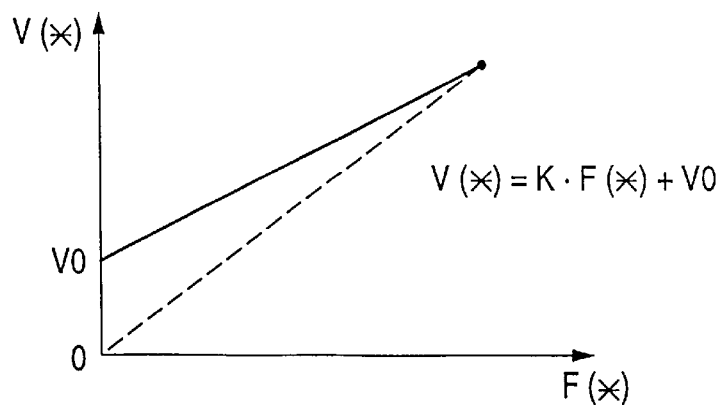
FIG. 13 is a graph showing a relationship between a frequency command value and a voltage command value in the conventional voltage-type inverter device.
Figure 14:
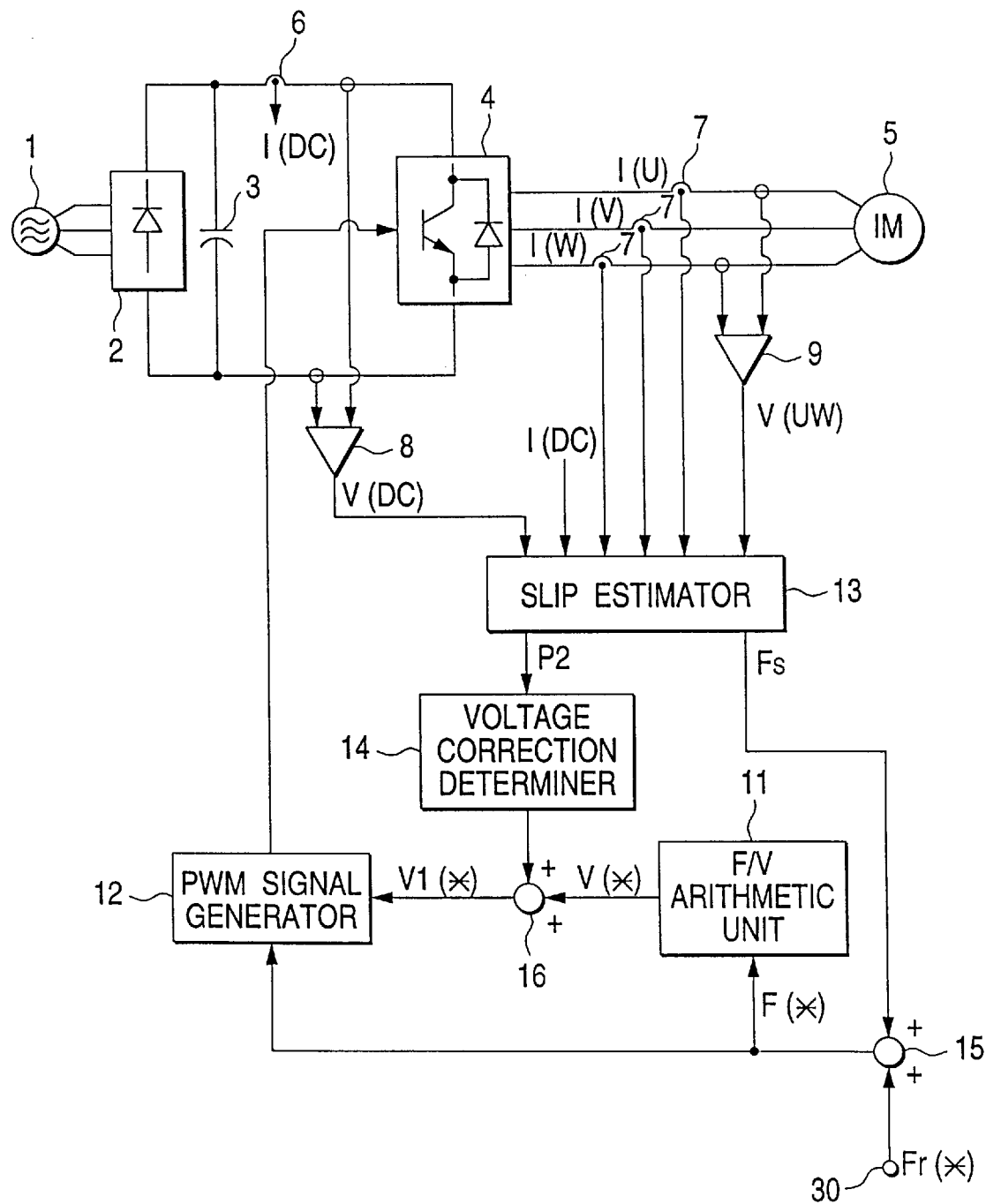
FIG. 14 is a block diagram showing a conventional voltage-type inverter device equipped with control of slip frequency.
Figure 15:
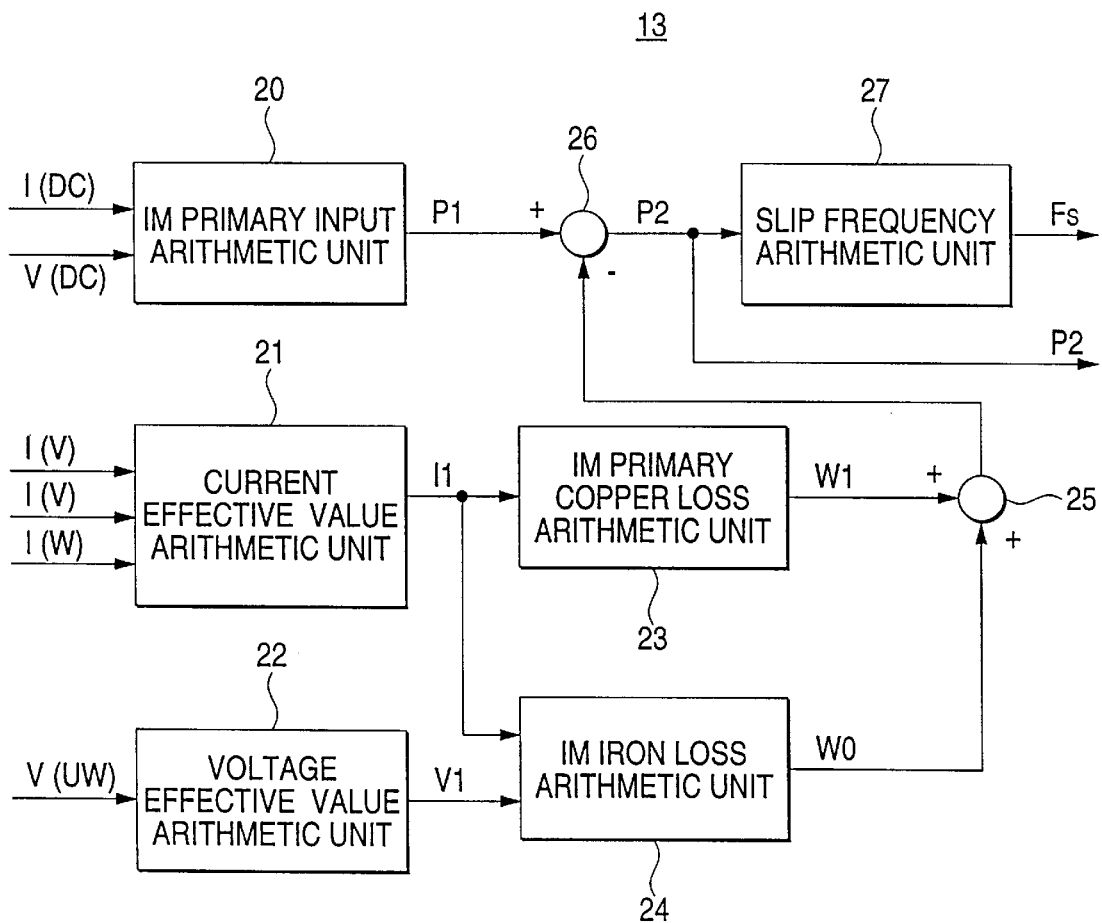
FIG. 15 is a block diagram showing the configuration of a conventional slip estimator.

Referring to FIG. 11, an explanation will be given of this embodiment. This embodiment is directed to another example of a control circuit for a voltage type inverter device which can switch a command inputting system between a system of inputting a voltage command value and another system of inputting a frequency command value. From the signal input terminal 30, a voltage command value V* is inputted which is a voltage command corresponding to the speed command for the induction motor 5, whereas a rotary speed command value Fr(*) is inputted from the signal input terminal 10. In this figure, like reference numerals refer to like or corresponding parts in the prior art or the first to third embodiments. SW5 to SW9 denote switches for switching the input system between a system of inputting a voltage command value and another system of inputting a frequency command value (inclusive of a command value of the rotary speed).

Where the frequency command value inputting system is selected, the switches SW5 to SW9 are placed in the state as shown in FIG. 11. The rotary speed command value Fr(*) inputted from-the signal input terminal 10 is added to the slip frequency estimated value FS created by the slip estimator 9 by the adder 15 serving as the fifth arithmetic means to create a frequency command F(*) to be supplied to the PWM signal generator 12. On the other hand, the F/V arithmetic unit 11 serving as the sixth arithmetic means creates, on the basis of the frequency command F(*) created by the adder 15, a voltage command V(*) corresponding to the frequency command F(*). The adder 16 serving as the seventh arithmetic means adds the voltage command V(*) to the output voltage corrected value ΔV1 created by the voltage corrected determiner 14 on the basis of the secondary input P2 which is an output from the slip estimator 9, thus creating a voltage corrected command value V1(*) to be supplied to the PWM signal generator 12. On the basis of these frequency command F(*) and the voltage command V(*), the PWM signal generator 12 controls the inverter circuit 4.

On the other hand, where the voltage command value inputting system is selected, the switches SW5 to SW9 are placed in the state moved in the directions indicated by arrows indicated in FIG. 11. The voltage command value V(*) supplied from a signal input terminal 30 is converted into a frequency command F(*) corresponding to the voltage command value V(*) by the V/F arithmetic unit 17 serving as the third arithmetic means. The frequency command is added to the slip frequency estimated value Fs from the slip estimator 9 by the adder 37 serving as the fourth arithmetic means to create a corrected command frequency F1(*) which will be supplied to the PWM signal generator 12.

By the subtractor 32 serving as the first arithmetic means, the voltage command value V(*) is compared with the output voltage V detected by the 1/2 V(DC) detection circuit 31. The voltage command value V(*) is also added to an error voltage ΔV created by the subtractor 32 by the adder 33 serving as the second arithmetic means to create a voltage corrected command value V1 (*) to be supplied to the PWM signal generator 12. On the basis of these frequency command F(*) and voltage command V(*), the PWM signal generator 12 controls the inverter circuit 4.

Thus, in accordance with this embodiment, also in the system for correcting a change in the slip attendant on the increase or decrease in the load in the induction motor to control the speed of the induction motor precisely, the command inputting system can be switched between the voltage command value inputting system and the frequency command inputting system. Either command inputting system can be preferably selected in accordance with a system using the voltage type inverter device. Accordingly, the voltage type inverter device with very high flexibility can be provided.

Since the present invention is configured as described above, the following effects can be obtained.

In a voltage type inverter device provided with an inverter circuit connected across a DC power supply for generating a DC voltage to convert the DC voltage into an AC voltage having a predetermined voltage and frequency, since it comprises a 1/2 V(DC) detecting circuit for detecting a voltage between one end of said DC power supply and an output from said inverter circuit; a voltage command value setting means for commanding an output voltage from said inverter circuit; a first arithmetic means for receiving the voltage command value from the voltage command value setting means and a detection voltage from said 1/2 V (DC) detection circuit to produce an error voltage; and a second arithmetic means for receiving the error voltage from said first arithmetic means and the voltage command value from the said voltage command value setting means to produce a voltage corrected command value, a voltage command value can be directly given to control the output voltage from the inverter to follow the command voltage accurately.

Since the first arithmetic means receives a voltage command value in the form of a pulse signal from said voltage command value setting means and the detected voltage in the form of a pulse signal from said 1/2 V(DC) detecting circuit to produce an error voltage in the form of a pulse signal, the voltage command value can be digitally compared with the detected voltage to create the error voltage, and hence the output voltage from the inverter circuit can follow the command voltage accurately.

A pulse waveform of said error voltage from said first arithmetic means is created in such a manner that the pulse waveform of the voltage command value from said voltage command value setting means and that of the detected voltage from the 1/2 V (DC) detection circuit are instantaneously compared to each other to remove the difference created by both pulse waveforms. For this reason, the difference can be removed with good response and so the output voltage from the inverter can respond to the command voltage accurately.

The voltage type inverter device according to the present invention further comprises a PWM signal generator for receiving the voltage corrected command value from said second arithmetic means and a frequency command value commanding a frequency command value from said inverter circuit. For this reason, the switching element of the inverter circuit is PWM-controlled so that the output voltage and output frequency of the inverter circuit can be accurately controlled to a desired value.

Since the frequency command value supplied to said PWM signal generator is a certain frequency command, with the output frequency of the inverter being constant, the output voltage of the inverter can be accurately controlled to a desired value, thus providing a constant-frequency constant-voltage power supply with high precision.

Since the frequency command value supplied to said PWM signal generator is a frequency command varying in a predetermined relationship with the voltage command value from said voltage command value setting means, with the output frequency of the inverter having a predetermined relationship with its output voltage, the output voltage can be accurately controlled to a desired value, thus providing a variable-frequency variable-voltage supply with high precision.

The voltage type inverter device according to the present invention further comprises a slip estimator for receiving an AC current supplied to an induction motor connected to said inverter circuit and the detected voltage from said 1/2 V to create a slip frequency estimated value for said induction motor; a third arithmetic means for receiving a voltage command from the voltage command value setting means to create a frequency command varying a predetermined relationship with the voltage command value; and a fourth arithmetic means for receiving a the frequency command from the third arithmetic means and a slip frequency estimated value from said slip estimator to create a corrected command frequency, wherein said corrected command frequency is a frequency command value for said PWM signal generator.

The voltage-type inverter device according to the present invention further comprises a third arithmetic means for receiving a voltage command from the voltage command value setting means to create a frequency command varying a predetermined relationship with the voltage command value; a fourth arithmetic means for receiving a frequency command value set from an external device to create the voltage command value varying in a predetermined relationship with the frequency command value; a PWM signal generator for receiving a voltage command value and a frequency command value to produce a PWM signal for driving said inverter circuit; and a switching means for switching a the voltage command value and frequency command value for the PWM signal generator between the case where they are the voltage corrected command value from the second arithmetic means and the frequency command from the third arithmetic means and the case where they are voltage command value from the fourth arithmetic means and the frequency command value from the external device. For this reason, the command system is switched between the voltage command value inputting system and the frequency command system, thus providing a flexible voltage type inverter device which can adopt an optimum command system as necessity requires.

The voltage-type inverter device according to the present invention further comprises: a third arithmetic means for receiving the voltage command from the voltage command value setting means to create a frequency command varying a predetermined relationship with the voltage command value; a slip estimator for receiving an AC current supplied to an induction motor connected to said inverter circuit and the detected voltage from said 1/2 V (DC) detection circuit to create the slip frequency estimated value for said induction motor and a secondary input to said induction motor; a fourth arithmetic means receiving the slip frequency estimated value from the slip estimator the frequency command from said third computing to create a corrected command frequency; a fifth arithmetic means for receiving the command value set by the external device and the slip frequency estimated value by the slip estimator; a sixth arithmetic means for receiving the frequency command from the fifth arithmetic means to produce a voltage command varying in a predetermined relationship the frequency command; a voltage corrected amount determiner for receiving a secondary input from said slip estimator to create a voltage corrected amount; a seventh arithmetic means for receiving the voltage corrected value from said voltage corrected amount determiner and the voltage command from said sixth arithmetic means to create a voltage corrected value; a PWM signal generator for receiving the voltage command value and the frequency to create a PWM signal for driving said inverter circuit; and a switching means for switching the voltage command value and frequency command value for the PWM signal generator between the case where they are the voltage corrected command value from the second arithmetic means and the frequency command from the fourth arithmetic means and the case where they are the voltage command value from the seventh arithmetic means and the frequency command value from the fifth computing means. For this reason, the command system is switched between the voltage command value inputting system and the frequency command system, thus providing a flexible voltage type inverter device which has flexibility capable of adopting an optimum command system as necessity requires and can control the speed of the induction motor accurately.

Each of an upper arm switching element and a lower arm switching element includes individually said 1/2 V (DC) detection circuit, said first computing means, said second computing means, and the PWM signal generator for generating a PWM signal on the basis of the second computing means. For this reason, the voltage of each of the upper arm switching element and the lower arm switching element is individually controlled so that influence from the upper-lower arm short-circuiting time and on-voltage of the switching element of the main circuit are removed to control the output voltage from the inverter circuit very accurately.

For each of output phase of said inverter circuit, a single module is constituted by said 1/2 V (DC) detection circuit, said first computing means, said second computing means, said PWM signal generator, said upper arm switching element and said lower arm switching element. For this reason, the configuration of the control circuit for the voltage-type inverter device can be simplified so that the output voltage of the inverter circuit can be controlled reliably and accurately.

Further, in a method of controlling a voltage type inverter device provided with an inverter circuit connected across a DC power source for generating a DC voltage and serving to convert the DC current into an AC voltage having a predetermined voltage and frequency, the voltage between one end of said DC power and the output from said inverter circuit is detected, an error voltage is created on the basis of the detected voltage and a voltage command for commanding the output voltage from the inverter circuit, and a voltage corrected command value is created on the basis of the error voltage and said voltage command value. For this reason, the output voltage can respond to the command voltage accurately.

Since the detected voltage, voltage command value and error voltage are a pulse signal, respectively, the voltage command value and the detected value are digitally compared with each other. Thus, the output voltage from the inverter circuit can respond to the command voltage accurately.

The pulse waveform of the error voltage is created in such a manner that the pulse waveform of said voltage command value and the pulse waveform of said detected voltage are instantaneously compared with each other, and the error generated by both pulse waveforms is removed. For this reason, the difference can be removed with good response and so the output voltage from the inverter can respond to the command voltage accurately.

Since a PWM signal is created on the basis of said voltage corrected command value and the frequency command value for commanding the output frequency from the inverter circuit, the switching element of the inverter can be PWM-controlled. Thus, the output voltage and output frequency of the inverter can be controlled accurately.

A slip frequency estimated value is created from the AC current supplied to an induction motor connected to said inverter circuit, a frequency command varying in a predetermined relationship with said voltage command value, a corrected command frequency is created from the frequency command and said slip frequency estimated value, and a PWM signal for driving said inverter circuit is created on the basis of the corrected command frequency. For this reason, the command frequency is created taking into consideration a slip change attendant to a load change in the induction motor so that the output voltage from the inverter circuit can be controlled to a desired value and the speed of the induction motor can be also controlled accurately.

A first frequency varying in a predetermined relationship with said voltage command value, a second voltage command value varying in a predetermined relationship with a frequency command value set by an external device, and a PWM signal for driving said inverter circuit is switched between the case where it is created from said voltage corrected command value and said first frequency command and the case where it is created set by the external device and the said second voltage command value. For this reason, the command system is switched between the voltage command inputting system and the frequency command system, thus providing a flexible voltage type inverter device which can adopt an optimum command system as necessity requires.

A frequency command varying in a predetermined relationship with said voltage command voltage; a slip frequency estimated value of said induction motor and a secondary input to said induction motor are created from the AC current supplied to an induction motor connected to said inverter circuit and said detected voltage; a first corrected frequency is created from said slip frequency estimated value and the frequency command varying in a predetermined voltage command; a second corrected command frequency is created from the frequency command value set by the external device and said slip frequency estimated value; a voltage command varying in a predetermined relationship with the second corrected command frequency; a voltage corrected value is created by the secondary input to said induction motor, a second voltage corrected command value is created from the voltage corrected value and said voltage command from said second corrected command frequency, and the PWM signal for driving said inverter circuit is switched between the case where it is created on the basis of the voltage corrected command value and said first corrected command frequency and the case where it is created on the basis of said second voltage corrected command value and said second corrected command frequency. For this reason, the command system is switched between the voltage command value inputting system and the frequency command system, thus providing a flexible voltage type inverter device which has flexibility capable of adopting an optimum command system as necessity requires and can control the speed of the induction motor accurately.

For each of the upper arm switching element and lower arm switching element of said inverter circuit, the voltage between the one end of said DC power source and the output from said inverter is detected; an error voltage is created from each detected voltage and the voltage command value commanded by the upper arm switching element and the lower arm switching element; and the voltage corrected command value corresponding each of the switching elements is created from each error voltage and said voltage command value. For this reason, the voltage of each of the upper arm switching element and the lower arm switching element is individually controlled so that influence from the upper-lower arm short-circuiting time and on-voltage of the switching element of the main circuit are removed to control the output voltage from the inverter circuit very accurately.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A voltage type inverter device provided with an inverter circuit connected across a DC power supply for generating a DC voltage to convert the DC voltage into an AC voltage having a predetermined voltage and frequency, said voltage type inverter device comprising:
    a 1/2 V(DC) detecting circuit for detecting a voltage between one end of said DC power supply and an output from said inverter circuit;
    a voltage command value setting means for commanding an output voltage from said inverter circuit;
    a first arithmetic means for receiving the voltage command value from the voltage command value setting means and a detected voltage from said 1/2 V (DC) detection circuit to produce an error voltage; and
    a second arithmetic means for receiving the error voltage from said first arithmetic means and the voltage command value from the said voltage command value setting means to produce a voltage corrected command value.

2. A voltage type inverter type device according to claim 1, wherein said first arithmetic means receives the voltage command value in the form of a pulse signal from said voltage command value setting means and the detected voltage in the form of a pulse signal from said 1/2 V(DC) detecting circuit to produce an error voltage in the form of a pulse signal.

3. A voltage type inverter device according to claim 2, wherein a pulse waveform of said error voltage from said first arithmetic means is created in such a manner that the pulse waveform of the voltage command value from said voltage command value setting means and that of the detected value from the 1/2 V (DC) detection circuit are simultaneously compared to each other to remove the difference created by both pulse waveforms.

4. A voltage type inverter device according to claim 1, further comprising:
    a PWM signal generator for receiving the voltage corrected command value from said second arithmetic means and a frequency command value commanding a frequency command value from said inverter circuit to create a PWM signal for driving said inverter circuit.

5. A voltage type inverter device according to claim 4, wherein said frequency command value supplied to said PWM signal generator is a fixed frequency command.

6. A voltage type inverter device according to claim 4, wherein said frequency command value supplied to said PWM signal generator is a frequency command varying in a predetermined relationship with the voltage command value from said voltage command value setting means.

7. A voltage type inverter device according to claim 4, further comprising:
    a slip estimator for receiving an AC current supplied to an induction motor connected to said inverter circuit and the detected voltage from said 1/2 V to create a slip frequency estimated value for said induction motor;
    a third arithmetic means for receiving the voltage command from the voltage command value setting means to create a frequency command varying a predetermined relationship with the voltage command value; and
    a fourth arithmetic means for receiving the frequency command from the third arithmetic means and the slip frequency estimated value from said slip estimator to create a corrected command frequency, wherein said corrected command frequency is a frequency command value for said PWM signal generator.

8. A voltage-type inverter device according to claim 1, further comprising:
    a third arithmetic means for receiving the voltage command from the voltage command value setting means to create a frequency command varying a predetermined relationship with the voltage command value;
    a fourth arithmetic means for receiving a frequency command value set from an external device to create the voltage command value varying in a predetermined relationship with the frequency command value;
    a PWM signal generator for receiving a voltage command value and a frequency command value to produce a PWM signal for driving said inverter circuit; and
    a switching means for switching the voltage command value and frequency command value for the PWM signal generator between the case where they are the voltage corrected command value from the second arithmetic means and the frequency command from the third arithmetic means and the case where they are voltage command value from the fourth arithmetic means and the frequency command value from the external device.

9. A voltage-type inverter device according to claim 1, further comprising:
    a third arithmetic means for receiving a voltage command from the voltage command value setting means to create a frequency command varying a predetermined relationship with the voltage command value;
    a slip estimator for receiving an AC current supplied to an induction motor connected to said inverter circuit and the detected voltage from said 1/2 V (DC) detection circuit to create the slip frequency estimated value for said induction motor and a secondary input;

a fourth arithmetic means receiving the slip frequency estimated value from the slip estimator and the frequency command from said third arithmetic means to create a corrected command frequency;

a fifth arithmetic means for receiving the command value set by the external device and the slip frequency estimated value by the slip estimator;

a sixth arithmetic means for receiving the frequency command from the fifth arithmetic means to produce a voltage command varying in a predetermined relationship the frequency command;

a voltage corrected amount determiner for receiving the secondary input from said slip estimator to create a voltage corrected amount;

a seventh arithmetic means for receiving the voltage corrected value from said voltage corrected arithmetic determiner and the voltage command from said sixth arithmetic means to create a voltage corrected value;

a PWM signal generator for receiving the voltage command value and the frequency to create a PWM signal for driving said inverter circuit; and a switching means for switching the voltage command value and frequency command value for the PWM signal generator between the case where they are the voltage corrected command value from the second arithmetic means and the frequency command from the fourth arithmetic means and the case where they are voltage command value from the seventh arithmetic means and the frequency command value from the fifth arithmetic means.

10. A voltage type inverter device according to claim 1, wherein each of an upper arm switching element and a lower arm switching element includes individually said 1/2 V (DC) detection circuit, said first arithmetic means, said second arithmetic means, and the PWM signal generator for generating a PWM signal on the basis of the second arithmetic means.

11. A voltage type inverter device according to claim 10, wherein for each of output phase of said inverter circuit, a single module is constituted by said 1/2 V (DC) detection circuit, said first arithmetic means, said second arithmetic means, said PWM signal generator, said upper arm switching element and said lower arm switching element.

12. A method of controlling a voltage type inverter device provided with an inverter circuit connected across a DC power source for generating a DC voltage and serving to convert the DC current into an AC voltage having a predetermined voltage and frequency, said method comprising the steps of:

detecting the voltage between one end of said DC power and the output from said inverter circuit;

creating an error voltage on the basis of the detected voltage and a voltage command for commanding the output voltage from the inverter circuit; and creating a voltage corrected command value on the basis of the error voltage and said voltage command value.

13. A method of controlling a voltage type inverter according to claim 12, wherein said detected voltage, voltage command value and error voltage comprise a pulse signal, respectively.

14. A method of controlling a voltage type inverter according to claim 12, wherein the pulse waveform of the error voltage is created in such a manner that the pulse waveform of said voltage command value and the pulse waveform of said detected voltage are compared instantaneously, and the error generated by both pulse waveforms is removed.

15. A method of controlling a voltage type inverter according to claim 12, wherein a PWM signal is created on the basis of said voltage corrected command value and the frequency command value for commanding the output frequency from the inverter circuit.

16. A method of controlling a voltage type inverter according to claim 15, further comprising the steps of:

creating a slip frequency estimated value from the AC current supplied to an induction motor connected to said inverter circuit;

varying a frequency command in a predetermined relationship with said voltage command value;

creating a corrected command frequency from the frequency command and said slip frequency estimated value; and creating a PWM signal for driving said inverter circuit on the basis of the corrected command frequency.

17. A method of controlling a voltage type inverter according to claim 12, further comprising the steps of:

creating a first frequency varying in a predetermined relationship with said voltage command value;

creating a second voltage command value varying in a predetermined relationship with a frequency command value set by an external device; and switching a PWM signal for driving said inverter circuit between the case where it is created from said voltage corrected command value and said first frequency command and the case where it is created set by the external device and the said second voltage command value.

18. A method of controlling a voltage type inverter according to claim 12, further comprising the steps of:

creating a frequency command varying in a predetermined relationship with said voltage command voltage;

creating a slip frequency estimated value of said induction motor and a secondary input to said induction motor from the AC current supplied to an induction motor connected to said inverter circuit and said detected voltage;

creating a first corrected frequency from said slip frequency estimated value and the frequency command varying in a predetermined relationship with said voltage command value;

creating a second corrected command frequency from the frequency command value set by the external device and said slip frequency estimated value;

creating a voltage command varying in a predetermined relationship with the second corrected command frequency;

creating a voltage corrected value from the secondary input to said induction motor;

creating a second voltage corrected command value from the voltage corrected value and said voltage command from said second corrected command frequency; and switching the PWM signal for driving said inverter circuit between the case where it is created on the basis of the voltage corrected command value and said first corrected command frequency and the case where it is created on the basis of said second voltage corrected command value and said second corrected command frequency.

19. A voltage type inverter according to claim 12, further comprising, for each of the upper arm switching element and lower arm switching element of said inverter circuit, detecting the voltage between the one end of said DC power source and the output from said inverter;

creating an error voltage from each detected voltage and the voltage command value commanded by the upper arm switching element and the lower arm switching element; and creating the voltage corrected command value corresponding each of the switching elements from each error voltage and said voltage command value.

* * * * *